C. E. BROAD.
MOTOR VEHICLE.
APPLICATION FILED OCT. 28, 1912.

1,237,463. Patented Aug. 21, 1917.

Witnesses
P. J. Gathmann
B. M. Kent

Inventor
Charles E. Broad
By Esler, Freeman, Watson & Coit,
Attorneys

UNITED STATES PATENT OFFICE.

CHARLES E. BROAD, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,237,463.

Specification of Letters Patent.  Patented Aug. 21, 1917.

Application filed October 28, 1912.  Serial No. 728,308.

*To all whom it may concern:*

Be it known that I, CHARLES E. BROAD, a citizen of the United States, residing at Detroit, Wayne county, State of Michigan, have invented certain new and useful Improvements in Motor-Vehicles, of which the following is a specification.

This invention relates to wheels and more particularly to steering wheels for motor vehicles. One of the objects of the invention is to provide a wheel of simple construction having a pair of spaced roller bearings on the interior of its hub and a pivotal connection between the axle and the steering knuckle, on which the wheel is mounted, arranged substantially in the plane of the wheel and between the bearings, whereby a well-balanced construction is produced and comparatively large bearing surfaces may be provided in the knuckle and axle, for the pivot.

Another object is to provide, in connection with the wheel, a steering knuckle, having a retaining plate for the inner bearing, and a steering arm arranged on the plate, the steering arm and plate being secured to the knuckle by the same bolts.

Other objects and the features of novelty will be apparent from the following description taken in connection with the accompanying drawings, in which.

Figure 2:
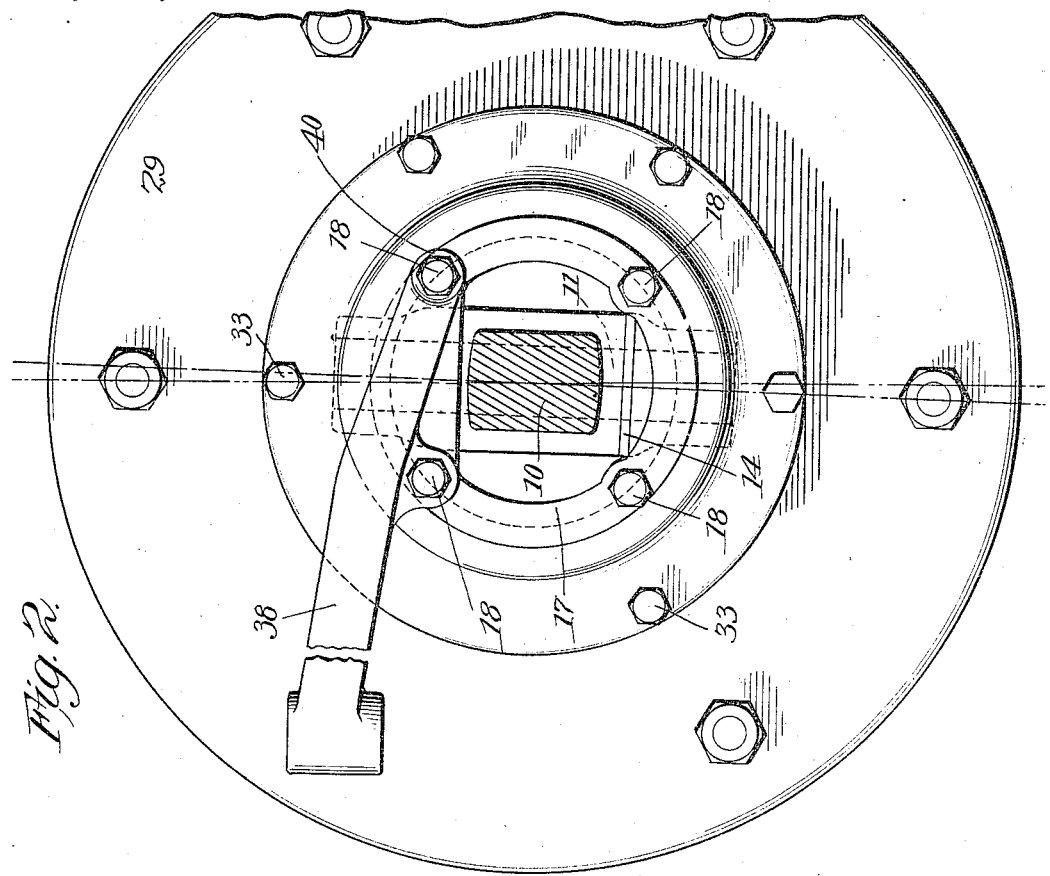
Fig. 2 is an elevation of the inner side of the wheel and knuckle shown in Fig. 1.

Referring to the drawings, 10 indicates an axle member having an eye at its end, in which is arranged a pivot pin 11, this pin being secured to the axle by a set screw 12. A steering knuckle 13 is arranged on the end of the axle and secured thereto by means of the pin 11, a thrust ring 14 being arranged between the lower side of the axle and the knuckle for transmitting the load, on the axle, to the knuckle, and for wearing purposes.

As shown in Fig. 2 the pin 11 may be inclined slightly from the vertical in order to provide what is commonly known as the "trailing" construction wherein the point of contact of the wheel with the ground is slightly to the rear of the intersection of the axis of the pivot with the ground so that in case of breakage of the steering mechanism the wheel has a tendency to trail behind the pivot.

Figure 1:
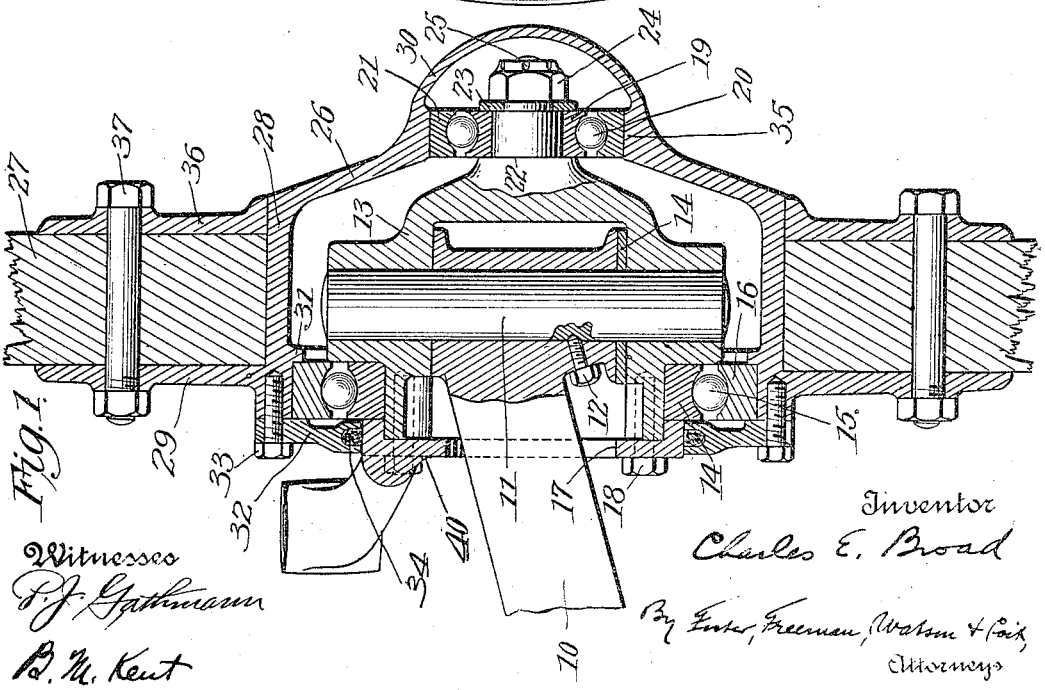
Figure 1 is a substantially vertical transverse section through a wheel and steering knuckle embodying the invention.

The inner end of the steering knuckle 13 is turned to provide a seat for the inner ring 14 of a roller bearing which comprises, in addition to this ring, the balls 15 and the outer ring 16. As clearly shown in Fig. 1, the ring 14 is securely held against outward movement on the knuckle by means of a shoulder on the latter, and is also held against inward movement by means of an annular plate 17, this plate being secured to the knuckle by means of bolts 18.

The outer end of the knuckle is reduced in diameter and has arranged thereon the inner ring 19 of a roller bearing which comprises, in addition to this ring, the balls 20 and the outer ring 21. The inner ring 19 of this bearing is held against inward movement on the knuckle by the shoulder 22 and is held against outward movement by means of a washer 23 and an outwardly removable nut 24, the latter being secured on the knuckle by a cotter pin 25, or other suitable locking means.

A wheel comprising a hub member 26 and spokes 27 is mounted on the knuckle by means of the bearings abovementioned. The hub member of the wheel preferably consists of a cylindrical body portion 28 surrounding the pivot 11 and forming a seat for the inner ends of the spokes, an outwardly extending radial flange 29 at its inner end and an integral cap 30 at its outer end. On the interior of the cylindrical body portion 28 of the hub member is a shoulder 31, against which bears the bearing ring 16, this shoulder preventing outward movement of the ring relative to the hub member. The inner side of the hub member is closed by an annular plate 32 which also engages the ring 16 and is secured to the hub member by means of bolts 33. The inner edge of the plate 32 is provided with a recess 34 in which may be arranged felt or a heavy grease to provide a dust-proof joint between the plate and the periphery of the plate 17. The hub member 26 is also provided on its interior with a seat 35 for the bearing ring 21, the parts being so arranged that the ring is free to adjust itself axially relative to the hub member.

The flange 29 is preferably formed integral with the hub member, and an annular plate 36, which is mounted on the cylindrical portion 28 of the hub member, coöperates with the flange 29 to secure the spokes in position on the hub, the plate 36 and the spokes being clamped by means of suitable bolts 37.

A steering arm 38 is provided with a foot 40 which bears against the outer surface of the plate 17 and is held in position thereon by means of two of the bolts 18 which pass through the foot and also through the plate 17.

When it is desired to remove the wheel from the knuckle it is only necessary to take out the bolts 33, thereby permitting the wheel to be removed outwardly, leaving the bearings intact on the knuckle, where they are readily accessible for inspection and repair and may also be conveniently removed. In order to remove the outer bearing it is only necessary to take off the nut 24 and the washer 23, and in order to remove the inner bearing it is only necessary to take off the plate 17, thereby permitting the bearing to be removed inwardly. The pivot pin 11 may also be conveniently removed by loosening the set screw 12 and driving the pin either downwardly or upwardly.

From the drawings it will be obvious that the larger bearing at the inner end of the knuckle will take all of the side thrust of the wheel since the smaller bearing at the outer end of the knuckle is of the floating type on account of its being free to move axially relative to the hub member. The plate 32 revolves with the wheel and therefore by having the joint between the wheel and the knuckle at the inner edge of this plate it will be obvious that lubricant will not be forced out of the bearing by centrifugal action. It will also be seen that by having the pivot pin 11 between the bearings the knuckle and the axle may be provided with comparatively large bearing surfaces for the pin without producing an excessively large roller bearing at the inner end of the knuckle.

It will also be obvious to those skilled in the art that various changes may be made in the details of the construction, within the scope of the appended claim, and that therefore the invention is not limited to the exact details shown and described.

Having thus described the invention what is claimed is:

In a motor vehicle, the combination of a steering knuckle, a wheel, roller bearings between the wheel and steering knuckle, an annular plate at the inner end of the knuckle adapted to secure one of said bearings thereon, a steering arm and bolts passing through said steering arm and said plate for securing the same to said knuckle.

In testimony whereof I affix my signature in presence of two witnesses.

CHARLES E. BROAD.

Witnesses:
   H. D. CHURCH,
   N. BOER.

Copies of this patent may be obtained for five cents each, by addressing the "Commissioner of Patents, Washington, D. C."